United States Patent
Shimano et al.

(10) Patent No.: US 12,007,179 B2
(45) Date of Patent: Jun. 11, 2024

(54) HEAT EXCHANGER AND AIR CONDITIONER INCLUDING HEAT EXCHANGER

(71) Applicant: FUJITSU GENERAL LIMITED, Kanagawa (JP)

(72) Inventors: Daiki Shimano, Kanagawa (JP); Masatoshi Watanabe, Kanagawa (JP); Yoshinari Maema, Kanagawa (JP); Ryo Takaoka, Kanagawa (JP); Shohei Nakata, Kanagawa (JP); Kotaro Oka, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 337 days.

(21) Appl. No.: 17/435,278

(22) PCT Filed: Mar. 25, 2020

(86) PCT No.: PCT/JP2020/013239
§ 371 (c)(1),
(2) Date: Aug. 31, 2021

(87) PCT Pub. No.: WO2020/196593
PCT Pub. Date: Oct. 1, 2020

(65) Prior Publication Data
US 2022/0155029 A1 May 19, 2022

(30) Foreign Application Priority Data
Mar. 26, 2019 (JP) .................. 2019-058394

(51) Int. Cl.
*F28F 1/32* (2006.01)
*F28D 1/053* (2006.01)

(52) U.S. Cl.
CPC ............ *F28F 1/325* (2013.01); *F28D 1/053* (2013.01); *F28F 2215/12* (2013.01)

(58) Field of Classification Search
CPC .......... F28F 1/325; F28F 1/10; F28F 2215/04; F28F 2215/08; F28F 2215/10; F28F 2215/12; F28F 2225/06; F28D 1/053
See application file for complete search history.

(56) References Cited

U.S. PATENT DOCUMENTS 10,712,104 B2 * 7/2020 Maeda ................ F28D 1/05391
2013/0299153 A1 11/2013 Jindou et al.
(Continued)

FOREIGN PATENT DOCUMENTS

| CN | 106370045 A | 2/2017 |
|----|-------------|--------|
| CN | 109210964 A | 1/2019 |

(Continued)

OTHER PUBLICATIONS

Oct. 31, 2022, European Search Report issued for related EP Application No. 20777633.7.
(Continued)

*Primary Examiner* — Miguel A Diaz
(74) *Attorney, Agent, or Firm* — Paratus Law Group, PLLC

(57) ABSTRACT

A heat exchanger includes: a plurality of flat tubes; a fin in which a plurality of notches are arranged side by side in a vertical direction, the fin having a plurality of intermediate portions and a connecting portion connecting the intermediate portions to each other; and a first bulging portion having an upper end edge and a lower end edge provided between a first notch and a second notch, the upper end edge being positioned in the intermediate portion and the lower end edge being positioned in the connecting portion. The upper end edge has a first upper end positioned on an
(Continued)

intermediate portion side, and a second upper end positioned on a connecting portion side, the first upper end being positioned to be higher than the second upper end, or the first upper end being positioned at the same height as the second upper end.

7 Claims, 10 Drawing Sheets

(56) References Cited

U.S. PATENT DOCUMENTS

| | | | |
|---|---|---|---|
| 2015/0068244 A1* | 3/2015 | Lee | F28F 1/022 |
| | | | 165/166 |
| 2018/0106563 A1 | 4/2018 | Nakamura et al. | |
| 2018/0120039 A1 | 5/2018 | Nakamura et al. | |
| 2019/0285321 A1 | 9/2019 | Sato et al. | |
| 2019/0383567 A1 | 12/2019 | Maeda et al. | |
| 2020/0326111 A1* | 10/2020 | Maeda | F28D 1/05391 |

FOREIGN PATENT DOCUMENTS

| | | |
|---|---|---|
| EP | 3306251 A1 | 4/2018 |
| JP | 2012-154491 A | 8/2012 |
| JP | 2012-163317 A | 8/2012 |
| JP | 2015-031490 A | 2/2015 |
| JP | 2015-031491 A | 2/2015 |
| JP | 6466631 B1 | 2/2019 |
| WO | WO-2016067957 A1 * | 5/2016 ............. F28D 1/053 |
| WO | WO 2016/194043 A1 | 12/2016 |
| WO | WO 2016/194088 A1 | 12/2016 |
| WO | WO 2017/130399 A1 | 8/2017 |
| WO | WO 2018/003123 A1 | 1/2018 |
| WO | WO 2018/207321 A1 | 11/2018 |

OTHER PUBLICATIONS

Dec. 2, 2022, Chinese Office Action issued for related CN Application No. 202080019358.2.
Mar. 5, 2024, Japanese Decision to Grant Patent issued for related JP Application No. 2023-012237.

* cited by examiner

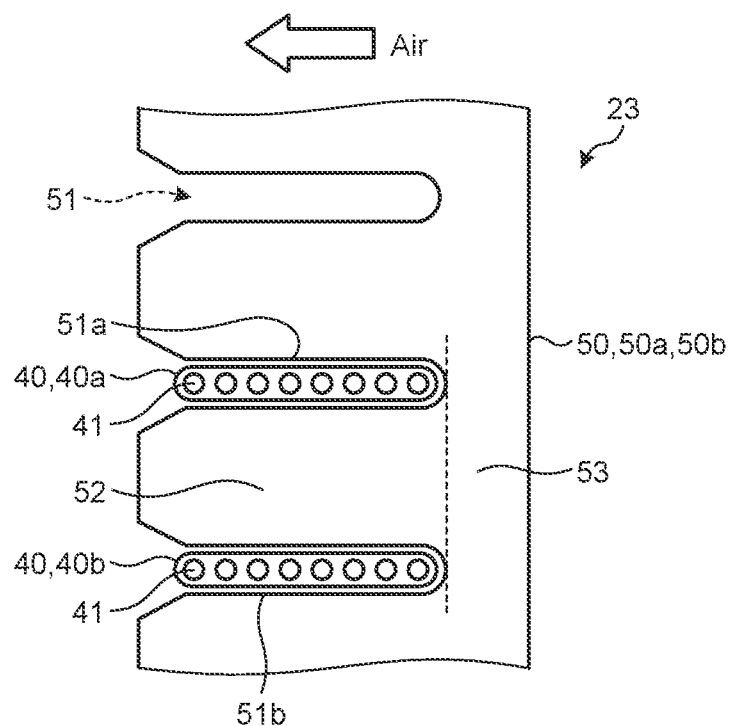

FIG.13A

| CONTACT ANGLE θ | [°] | 10 | | |
|---|---|---|---|---|
| FIN PITCH Pv | [mm] | 1.0 | 1.5 | 2.0 |
| DROPLET SIZE d2 | [mm] | 3.0 | 3.3 | 3.1 |

FIG.13B

| CONTACT ANGLE θ | [°] | 60 | | |
|---|---|---|---|---|
| FIN PITCH Pv | [mm] | 1.0 | 1.5 | 2.0 |
| DROPLET SIZE d2 | [mm] | 11.0 | 11.2 | 11.3 |

HEAT EXCHANGER AND AIR CONDITIONER INCLUDING HEAT EXCHANGER

CROSS REFERENCE TO PRIOR APPLICATION

This application is a National Stage Patent Application of PCT International Patent Application No. PCT/JP2020/013239 (filed on Mar. 25, 2020) under 35 U.S.C. § 371, which claims priority to Japanese Patent Application No. 2019-058394 (filed on Mar. 26, 2019), which are all hereby incorporated by reference in their entirety.

FIELD

The present invention relates to a heat exchanger and an air conditioner including the heat exchanger.

BACKGROUND

Conventionally, a heat exchanger using flat tubes in an air conditioner, has been known. In such a heat exchanger, when condensed water is retained in a water droplet form on a surface of at least one of flat tubes and fins, heat exchange between working fluid flowing through flow paths in the flat tubes and gas passing between the fins, is hindered by the condensed water, resulting in a bad influence on the performance of the heat exchanger.

In this regard, there has been disclosed a technique in which when an air conditioner is installed, a bulging portion guiding condensed water in the direction of gravity, is provided on a fin, to improve discharge of the condensed water (for example, see Patent Literature 1). Specifically, in this technique, the bulging portion formed to protrude from a flat portion of the fin, is formed in a shape in which a first end of the bulging portion is positioned in a region between upper and lower notches into which flat tubes are inserted, and a second end of the bulging portion is positioned to be lower than the first end in a region in which there is no notch.

However, the technique of Patent Literature 1 has a problem in that while the discharge of the condensed water adhering to the fins can be improved, the shape does not have a structure capable of actively discharging the condensed water retained around the flat tubes. That is, water droplets retained on lower surfaces of the flat tubes in a state where a surface tension, a gravity force, a static friction force, and the like are balanced, are not discharged until the water droplets greatly grow so that the gravity force exceeds a force acting in a direction opposite to the direction of gravity such as the surface tension. As illustrated in FIG. 4B, a large amount of the condensed water flows intensively along an intermediate portion-side edge $X_1$-$Z_1$ toward a direction $W_1$ in a bulging portion 54A. As a result, a small amount of the condensed water flows along a connecting portion-side edge $X_2$-$Z_2$ toward a direction $W_2$. Then, due to the influence of gravity, some of the large amount of the condensed water transferred in the direction $W_1$, is transferred in a direction $W_3$, and drops onto a second flat tube 40b (see FIG. 3) that is inserted into a second notch 51b, which is provided below the bulging portion 54A.

CITATION LIST

Patent Literature

Patent Literature 1: WO 2016/194043 A

SUMMARY

Technical Problem

The present invention has been made in view of the above, and an object of the present invention is to provide a heat exchanger capable of improving discharging of condensed water retained on surfaces of both fins and flat tubes, and an air conditioner including the heat exchanger.

Solution to Problem

According to an aspect of the embodiments, a heat exchanger includes: a plurality of flat tubes; a fin in which a plurality of notches are arranged side by side in a vertical direction for the plurality of flat tubes to be inserted thereinto, respectively, the fin having a plurality of intermediate portions, each formed between two of the notches positioned adjacent to each other in the vertical direction, and a connecting portion connecting the intermediate portions to each other; and a first bulging portion having an upper end edge and a lower end edge provided between a first notch and a second notch, the first notch being an upper notch and the second notch being a lower notch between the two notches positioned adjacent to each other in the vertical direction with the intermediate portion interposed therebetween, and the upper end edge being positioned in the intermediate portion and the lower end edge being positioned in the connecting portion, wherein the upper end edge has a first upper end positioned on an intermediate portion side, and a second upper end positioned on a connecting portion side, the first upper end being positioned to be higher than the second upper end, or the first upper end being positioned at the same height as the second upper end.

Advantageous Effects of Invention

According to the present invention, it is possible to improve discharging of condensed water retained on the surfaces of both the fins and the flat tubes.

BRIEF DESCRIPTION OF DRAWINGS

FIG. 3 is a view illustrating a relationship between a flat tube and a fin.

FIG. 13A is a view for comparing sizes d2 of condensed water (droplet) retained around a first flat tube 40a, and is a view illustrating droplet sizes d2 when the contact angle θ is 10°.

FIG. 13B is a view for comparing sizes d2 of condensed water (droplet) retained around a first flat tube 40a at different contact angles θ, and is a view illustrating respective droplet sizes d2 when the contact angle θ is 60°.

DESCRIPTION OF EMBODIMENTS

Embodiment

Hereinafter, an embodiment of the present invention will be described in detail with reference to the accompanying drawings. Note that the present invention is not limited to the following embodiment, and various modifications can be made without departing from the gist of the present invention.

<Configuration of Refrigerant Circuit>

Figure 1A:
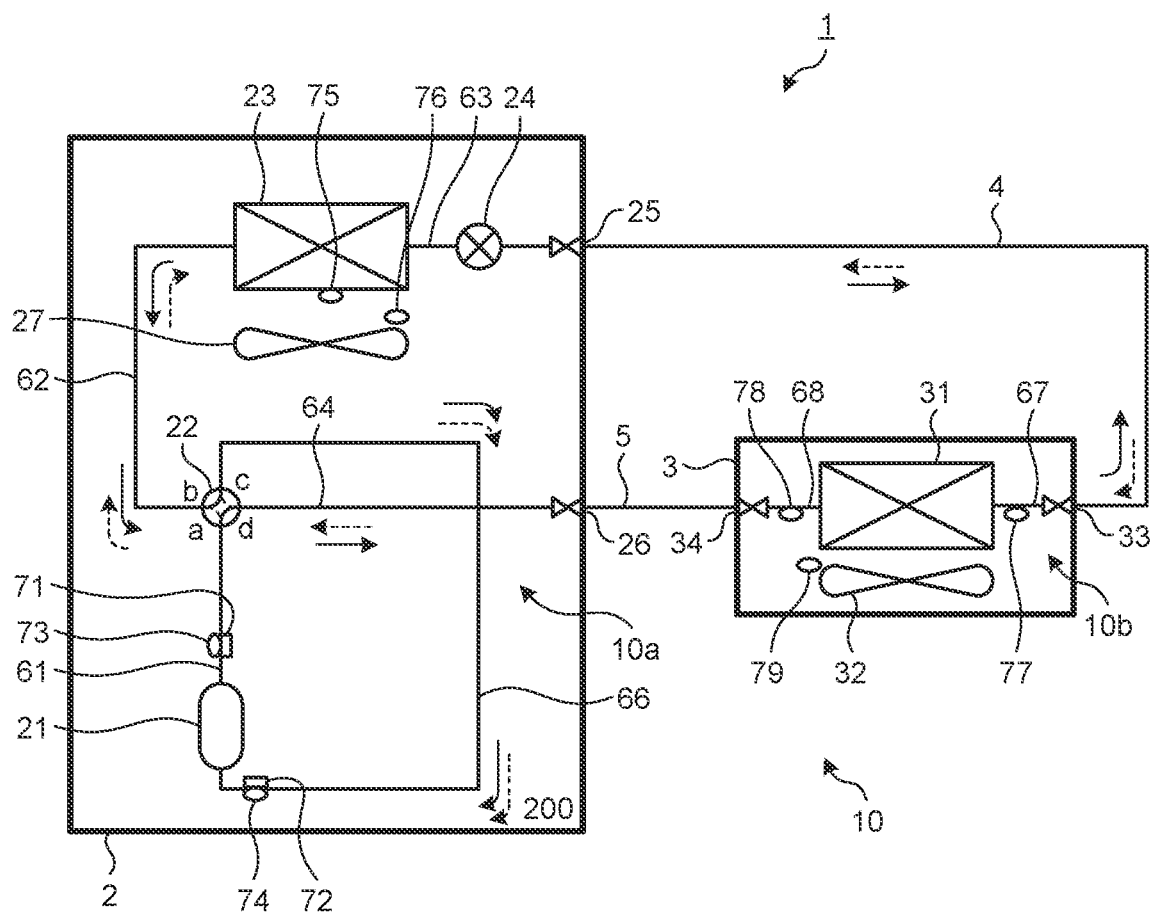
FIG. 1A is a refrigerant circuit diagram illustrating an example of an air conditioner according to an embodiment.

First, a refrigerant circuit of an air conditioner 1 including an outdoor unit 2, will be described with reference to FIG. 1A. As illustrated in FIG. 1A, the air conditioner 1 in the present embodiment includes an outdoor unit 2 that is installed outdoors, and an indoor unit 3 that is installed indoors and connected to the outdoor unit 2 through a liquid pipe 4 and a gas pipe 5. Specifically, a liquid-side shutoff valve 25 of the outdoor unit 2 and a liquid pipe connection portion 33 of the indoor unit 3 are connected to each other by the liquid pipe 4. In addition, a gas-side shutoff valve 26 of the outdoor unit 2 and a as pipe connection portion 34 of the indoor unit 3 are connected to each other by the gas pipe 5. As described above, a refrigerant circuit 10 of the air conditioner 1 is formed.

<<Refrigerant Circuit of Outdoor Unit>>

First, the outdoor unit 2 will be described. The outdoor unit 2 includes a compressor 21, a four-way valve 22, an outdoor heat exchanger 23, an expansion valve 24, a liquid-side shutoff valve 25 to which the liquid pipe 4 is connected, a gas-side shutoff valve 26 to with the gas pipe 5 is connected, and an outdoor fan 27. These devices, excluding the outdoor fan 27, are connected to each other by refrigerant pipes, which will be described later, to form an outdoor unit refrigerant circuit 10a constituting a part of the refrigerant circuit 10. Note that an accumulator (not illustrated) may be provided on a refrigerant suction side of the compressor 21.

The compressor 21 is a capacity-variable compressor whose rotational speed can be controlled by an inverter, which is not illustrated, to change an operating capacity. On a refrigerant discharge side of the compressor 21, a discharge pipe 61 is connected to a port a of the four-way valve 22. On the refrigerant suction side of the compressor 21, a suction pipe 66 is connected to a port c of the four-way valve 22.

The four-way valve 22 is a valve for switching a refrigerant flow direction, and includes four ports a, b, c, and d. As described above, the port a is connected to the refrigerant discharge side of the compressor 21 by the discharge pipe 61. The port b is connected to one refrigerant inlet/outlet port of the outdoor heat exchanger 23 by a refrigerant pipe 62. As described above, the port c is connected to the refrigerant suction side of the compressor 21 by the suction pipe 66. The port d is connected to the gas-side shutoff valve 26 by an outdoor unit gas pipe 64.

The outdoor heat exchanger 23 exchanges heat between the refrigerant and outside air introduced into the outdoor unit 2 as the outdoor fan 27 rotates, which will be described later. One refrigerant inlet/outlet port of the outdoor heat exchanger 23 is connected to the port b of the four-way valve 22 by the refrigerant pipe 62 as described above, and the other refrigerant inlet/outlet port of the outdoor heat exchanger 23 is connected to the liquid-side shutoff valve 25 by an outdoor unit liquid pipe 63. The outdoor heat exchanger 23 functions as a condenser during a cooling operation, and functions as an evaporator during a heating operation by switching the four-way valve 22.

The expansion valve 24 is an electronic expansion valve driven by a pulse motor, which is not illustrated. Specifically, an opened degree of the expansion valve 24 is adjusted based on the number of pulses applied to the pulse motor. During the heating operation, the opened degree of the expansion valve 24 is adjusted such that a discharge temperature, which is a temperature of the refrigerant discharged from compressor 21, reaches a predetermined target temperature.

The outdoor fan 27 is formed of a resin material, and is disposed near the outdoor heat exchanger 23. central portion of the outdoor fan 27 is supported by a rotation shaft of a fan motor, which is not illustrated. The fan motor rotates to rotate the outdoor fan 27. By the rotation of the outdoor fan 27, outside air is introduced into the outdoor unit 2 through a suction port, which is not illustrated, of the outdoor unit 2, and the outside air having exchanged heat with the refrigerant in the outdoor heat exchanger 23, is released to the outside of the outdoor unit 2 through a blow-out port, which is not illustrated, of the outdoor unit 2.

In addition to the configuration described above, various sensors are provided in the outdoor unit 2. As illustrated in FIG. 1A, a discharge pressure sensor 71 detecting a pressure of the refrigerant discharged from the compressor 21, and a discharge temperature sensor 73 detecting a temperature of the refrigerant discharged from the compressor 21 (the discharge temperature described above), are provided in the discharge pipe 61. A suction pressure sensor 72 detecting a pressure of the refrigerant sucked into the compressor 21, and a suction temperature sensor 74 detecting a temperature of the refrigerant sucked into the compressor 21, are provided in the suction pipe 66.

A heat exchange temperature sensor 75 detecting an outdoor heat exchange temperature, which is a temperature of the outdoor heat exchanger 23, is provided at a substantially middle portion of a refrigerant path, which is not illustrated, included in the outdoor heat exchanger 23. An outside air temperature sensor 76 detecting a temperature of outside air introduced into the outdoor unit 2, that is, an outside air temperature, is provided near the suction port, which is not illustrated, of the outdoor unit 2.

Figure 1B:
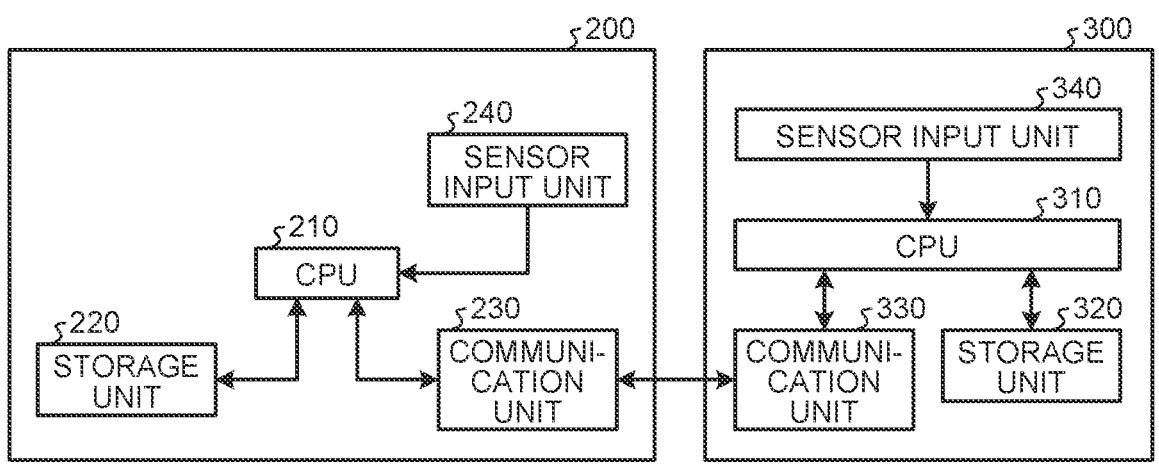
FIG. 1B is a block diagram of a control unit illustrating the example of the air conditioner according to the embodiment.

In addition, the outdoor unit 2 includes an outdoor unit control means 200. The outdoor unit control means 200 is mounted on a control board housed in an electric component box, which is not illustrated, of the outdoor unit 2. As illustrated in FIG. 1B, the outdoor unit control means 200 includes a CPU 210, a storage unit 220, a communication unit 230, and a sensor input unit 240.

The storage unit 220 includes a flash memory, and stores a program for controlling the outdoor unit 2, detection values corresponding to detection signals from the various sensors, states in which the compressor 21, the outdoor fan 27, and the like are controlled, etc. Although not illustrated, the storage unit 220 stores, in advance, a rotational speed table in which a rotational speed of the compressor 21 is defined based on a demanded capability to be received from the indoor unit 3.

The communication unit 230 is an interface for communication with the indoor unit 3. The sensor input unit 240 receives detection results from the various sensors of the outdoor unit 2, and outputs the detection results to the CPU 210.

The CPU 210 receives the respective detection results from the above-described sensors of the outdoor unit 2 via the sensor input unit 240. Further, the CPU 210 receives a control signal transmitted from the indoor unit 3 via the communication unit 230. The CPU 210 controls driving of the compressor 21, the outdoor fan 27, on the basis of the received detection results, control signal, and the like. In addition, the CPU 210 controls switching of the four-way valve 22 on the basis of the received detection results and control signal. Further, the CPU 210 adjusts an opened degree of the expansion valve 24 based on the received detection results and control signal.

<<Refrigerant Circuit of Indoor Unit>>

Next, the indoor unit 3 will be described with reference to FIG. 1A. The indoor unit 3 includes an indoor heat exchanger 31, an indoor fan 32, a liquid pipe connection portion 33 to which the other end of the liquid pipe 4 is connected, and a gas pipe connection portion 34 to which the other end of the gas pipe 5 is connected. These devices, excluding the indoor fan 32, are connected to each other by refrigerant pipes, which will be described in detail below, to form an indoor unit refrigerant circuit 10*b* constituting a part of the refrigerant circuit 10.

The indoor heat exchanger 31 exchanges heat between indoor air introduced into the indoor unit 3 from a suction port, which is not illustrated, of the indoor unit 3 and the refrigerant as the indoor fan 32 rotates, which will be described later. One refrigerant inlet/outlet port of the indoor heat exchanger 31 is connected to the liquid pipe connection portion 33 by an indoor unit liquid pipe 67. The other refrigerant inlet/outlet port of the indoor heat exchanger 31 is connected to the gas pipe connection portion 34 by an indoor unit gas pipe 68. The indoor heat exchanger 31 functions as an evaporator when the indoor unit 3 performs a cooling operation, and functions as a condenser when the indoor unit 3 performs a heating operation.

The indoor fan 32 is formed of a resin material, and is disposed near the indoor heat exchanger 31. The indoor fan 32 is rotated by a fan motor, which is not illustrated, to introduce indoor air into the indoor unit 3 through the suction port, which is not illustrated, of the indoor unit 3, and release the indoor air having exchanged heat with the refrigerant in the indoor heat exchanger 31 into an indoor space through a blow-out port, which is not illustrated, of the indoor unit 3.

In addition to the configuration described above, various sensors are provided in the indoor unit 3. liquid-side temperature sensor 77 detecting a temperature of the refrigerant flowing into the indoor heat exchanger 31 or flowing out of the indoor heat exchanger 31, is provided in the indoor unit liquid pipe 67. A gas-side temperature sensor 78 detecting a temperature of the refrigerant Flowing out of the indoor heat exchanger 31 or flowing into the indoor heat exchanger 31, is provided in the indoor unit gas pipe 68. A room temperature sensor 79 detecting a temperature of the indoor air flowing into the indoor unit 3, that is, a room temperature, is provided near the suction port, which is not illustrated, of the indoor unit 3.

In addition, the indoor unit 3 includes an indoor unit control means 300. As illustrated in FIG. 1B, the indoor unit control means 300 includes a CPU 310, a storage unit 320, a communication unit 330, and a sensor input unit 340 (in the present specification, the indoor unit control means 300 may be referred to simply as control means).

The storage unit 320 includes a flash memory, and stores a program for controlling the indoor unit 3, detection values corresponding to detection signals from the various sensors, states in which the indoor fan 32 and the like are controlled, etc. Although not illustrated, the storage unit 320 stores, in advance, a rotational speed table or the like in which rotational speed of the indoor fan 32 is defined, including a rotational speed for monitoring a leakage of the refrigerant while the operation is stopped, which will be described later.

The communication unit 330 is an interface for communication with the outdoor unit 2. The sensor input unit 340 receives detection results from the various sensors of the indoor unit 3, and outputs the detection results to the CPU 310.

The CPU 310 receives the respective detection results from the above-described sensors of the indoor unit 3 via the sensor input unit 340. Further, the CPU 310 receives a control signal transmitted from the outdoor unit 2 via the communication unit 330. The CPU 310 controls driving of the indoor fan 32, including driving for monitoring a leakage of the refrigerant while the operation is stopped, which will be described later, on the basis of the received detection results and control signal. In addition, the CPU 310 calculates a temperature difference between a set temperature set by a user operating a remote controller, which is not illustrated, and a room temperature detected by the room temperature sensor 79, and transmits a demanded capability based on the calculated temperature difference to the outdoor unit control means 200 of the outdoor unit 2 via the communication unit 330.

<Operation of Refrigerant Circuit>

Next, a flow of a refrigerant and an operation of each unit in the refrigerant circuit 10 during an air conditioning operation of the air conditioner 1 in the present embodiment, will be described with reference to FIG. 1A. Hereinafter, the description will be provided, assuming that the indoor unit 3 performs a heating operation based on a flow of the refrigerant indicated by a solid line in the drawing. Note that a flow of the refrigerant indicated by a broken line represents a cooling operation.

When the indoor unit 3 performs the heating operation, the CPU 210 switches the four-way valve 22 to be in a state indicated by the solid line in FIG. 1A, that is, to connect the port a and the port d of the four-way valve 22 to each other, and connect the port b and the port c of the four-way valve 22 to each other. As a result, the refrigerant circulates in the refrigerant circuit 10 in a direction indicated by solid arrows for a heating cycle, in which the outdoor heat exchanger 23 functions as an evaporator and the indoor heat exchanger 31 functions as a condenser.

The high-pressure refrigerant discharged from the compressor 21, flows through the discharge pipe 61 into the four-way valve 22. The refrigerant flowing into the port a of the four-way valve 22, flows into the outdoor unit gas pipe 64 through the port d of the four-way valve 22, and then flows into the gas pipe 5 via the gas-side shutoff valve 26. The refrigerant flowing through the gas pipe 5 flows into the indoor unit 3 via the gas pipe connection portion 34.

The refrigerant introduced into the indoor unit 3, flows through the indoor unit gas pipe 68 into the indoor heat exchanger 31 to exchange heat with indoor air introduced into the indoor unit 3 as the indoor fan 32 rotates, so that the refrigerant is condensed. As described above, the indoor heat exchanger 31 functions as a condenser, and the indoor air having exchanged heat with the refrigerant in the indoor heat exchanger 31, is blown into the indoor space from the blow-out port, which is not illustrated, thereby heating the indoor space, in which the indoor unit 3 is installed.

The refrigerant discharged from the indoor heat exchanger 31, flows through the indoor unit liquid pipe 67 into the liquid pipe 4 via the liquid pipe connection portion 33. The refrigerant introduced into the outdoor unit 2 via the liquid-side shutoff valve 25 after flowing through the liquid pipe 4, is decompressed at the time of passing through the expansion valve 24 while flowing through the outdoor unit liquid pipe 63. As described above, the opened degree of the expansion valve 24 during the heating operation, is adjusted such that the discharge temperature of the compressor 21 reaches the predetermined target temperature.

The refrigerant introduced into the outdoor heat exchanger 23 after passing through the expansion valve 24 exchanges heat with the outside air introduced into the outdoor unit 2 as the outdoor fan 27 rotates, so that the refrigerant is evaporated. The refrigerant discharged from the outdoor heat exchanger 23 into the refrigerant pipe 62 flows through the port b and the port c of the four-way valve 22 and the suction pipe 66, and is sucked into the compressor 21 so that the refrigerant is compressed again.

<Heat Exchanger>

The heat exchanger of the present embodiment can be applied to the indoor heat exchanger 31 of the indoor unit 3 and the outdoor heat exchanger 23 of the outdoor unit 2. However, in the following description, the heat exchanger of the present embodiment is applied to the outdoor heat exchanger (hereinafter, referred to simply as heat exchanger) 23 functioning as an evaporator during the heating operation of the outdoor unit 2.

Figure 2A:
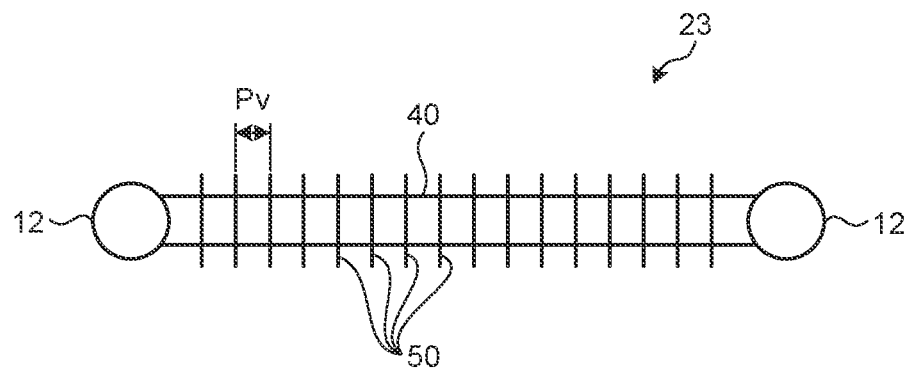
FIG. 2A is a plan view of an outdoor heat exchanger illustrating the outdoor heat exchanger according to the embodiment.
Figure 2B:
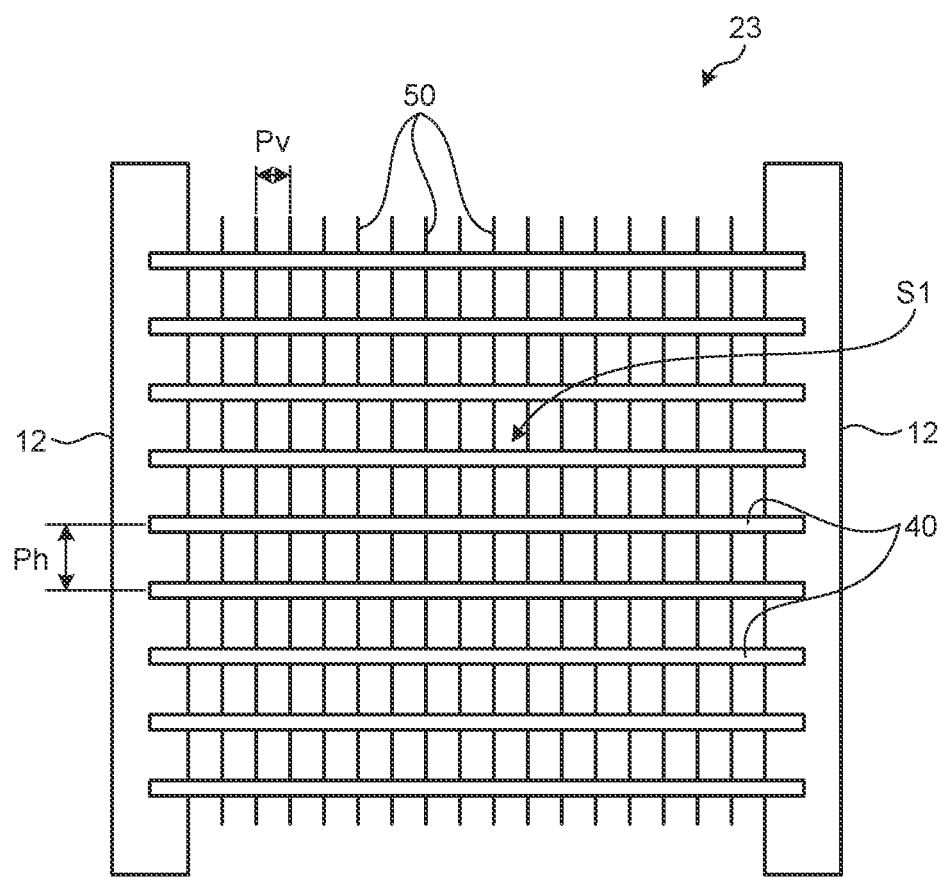
FIG. 2B is a front view of the outdoor heat exchanger illustrating the outdoor heat exchanger according to the embodiment.

FIGS. 2A and 2B are diagrams for explaining the heat exchanger 23 according to the present embodiment, and FIG. 2A is a plan view of the heat exchanger 23 and FIG. 2B is a front view of the heat exchanger 23. As illustrated in FIGS. 2A and 2B, the heat exchanger 23 includes: a plurality of flat tubes 40 as heat transfer tubes each having an oval cross-sectional shape or a rectangular shape with rounded corners, the plurality of flat tubes 40 being arranged in a vertical direction (a direction perpendicular to the refrigerant flow direction) such that side surfaces (wide surfaces) thereof face each other; a pair of left and right headers 12 connected to both ends of the plurality of flat tubes 40; and a plurality of fins 50 disposed in a direction intersecting with a direction in which the flat tubes 40 extend and bonded to each of the flat tubes 40 overall. The heat exchanger 23 is disposed in the outdoor unit 2 such that the direction, in which the plurality of flat tubes 40 are arranged (the longitudinal direction of the fins 50), is parallel to the direction of gravity. In the following description, with respect to two flat tubes 40 adjacent to each other in the vertical direction among the plurality of flat tubes 40, the upper flat tube 40 in the drawing may be referred to as first flat tube 40a, and the lower flat tube 40 in the drawing may be referred to as second flat tube 40b. Note that, in addition to these components, the heat exchanger 23 includes refrigerant pipes connected to the headers 12 (not illustrated), the refrigerant pipes connecting the heat exchanger 23 to other components of the air conditioner 1 to allow the refrigerant to flow therethrough.

More specifically, the flat tube 40 has a flat shape with respect to the vertical direction, and is provided along a direction in which the refrigerant flows between the pair of headers 12 (the longitudinal direction of the flat tube 40) while allowing air to flow along the lateral direction of the flat tube 40. A plurality of refrigerant flow paths 41 for the refrigerant to flow therethrough along the longitudinal direction of the flat tube 40, are formed inside the flat tube 40 side by side in the lateral direction of the flat tube 40. As illustrated in FIG. 2B, the plurality of flat tubes 40 are arranged in parallel to each other in the vertical direction with a gap S1 therebetween for passage of air, and both ends of each of the flat tubes 40 are connected to the pair of headers 12, respectively. Specifically, the plurality of flat tubes 40 extending in the longitudinal direction, are arranged at a predetermined arrangement pitch Ph with respect to the vertical direction (a distance of the gap S1 in the vertical direction), and both ends of each of the flat tubes 40 are connected to the headers 12, respectively.

The header 12 is formed in a cylindrical shape, and the refrigerant flow paths (not illustrated) are formed inside the header 12 such that the refrigerant supplied to the heat exchanger 23 is split to flow into the plurality of flat tubes 40 or the refrigerant flowing out of the plurality of flat tubes 40 joins together.

The fins 50 are formed in a flat plate shape when viewed from the front of the heat exchanger 23, and are arranged to be stacked in the longitudinal direction of the flat tubes 40 in such a manner as to intersect with the flat tubes 40. The plurality of fins 50 are arranged in parallel to each other with a gap S1 therebetween for passage of air. Specifically, the plurality of fins 50 formed along the vertical direction, are arranged at a predetermined fin pitch Pv with respect to the longitudinal direction of the flat tubes 40 (a distance of the gap S1 in the longitudinal direction of the flat tubes 40). In the following description, with respect to two fins 50 adjacent to each other in a horizontal direction among the plurality of fins 50, the left fin 50 in the drawing may be referred to as first fin 50a, and the right fin 50 in the drawing may be referred to as second fin 50b.

<Flat Tube, Fin, and Bulging Portion>

Next, a relationship between the flat tube 40, the fin 50, and a first bulging portion 54 will be described with reference to FIG. 3 and the subsequent drawings. First, as illustrated in FIG. 3, a plurality of notches 51 are arranged side by side in the vertical direction in the fin 50 for the plurality of flat tubes 40 to be inserted thereinto, respectively. The fin 50 has a plurality of intermediate portions 52 (portions on the leeward side) each formed between two notches 51 (a first notch 51a and a second notch 51b) positioned adjacent to each other in the vertical direction, and a connecting portion 53 (a portion on the windward side) connecting the intermediate portions 52 to each other. In the following description, with respect to two notches 51 adjacent to each other with an intermediate portion 52 interposed therebetween among the plurality of notches 51, the upper notch 51 in the drawing may be referred to as first notch 51a, and the lower notch 51 may be referred to as second notch 51b. The first flat tube 40a is inserted into the first notch 51a, and the second flat tube 40b is inserted into the second notch 51b. The plurality of refrigerant flow paths 41 for the refrigerant to flow therethrough are provided inside the flat tube 40, and the plurality of refrigerant flow paths 41 are arranged along the lateral direction of the flat tube 40 (a direction in which air flows).

Figure 4A:
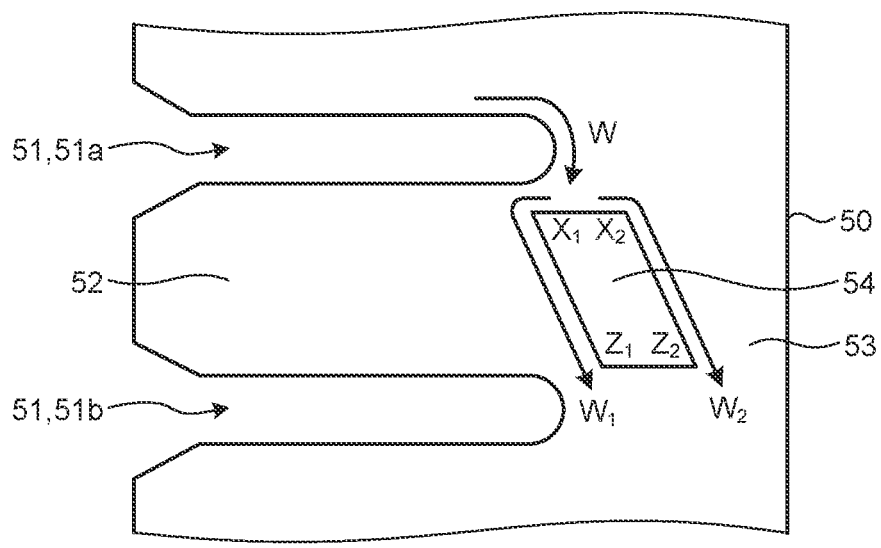
FIG. 4A is a view illustrating a first bulging portion in the embodiment.

As illustrated in FIG. 4A, the fin 50 has a first bulging portion 54 bulging in a thickness direction of the fin 50 (the longitudinal direction of the flat tube) between the first notch 51a and the second notch 51b. That is, in the vertical direction, the first notch 51a is located above the first bulging portion 54, and the second notch is located below the first bulging portion 54. The first bulging portion 54 has an upper end edge $X_1$-$X_2$ positioned from the intermediate portion 52 to the connecting portion 53 to straddle a boundary between the intermediate portion 52 and the connecting portion 53, and a lower end edge $Z_1$-$Z_2$ positioned in the connecting portion 53. The first bulging portion 54 is formed such that a first upper end $X_1$ of the first bulging portion 54 positioned on the intermediate portion 52 side is higher than a second upper end $X_2$ of the first bulging portion 54 positioned on the connecting portion 53 side, or the first upper end $X_1$ is positioned at the same height as the second upper end $X_2$. That is, although it is illustrated in FIG. 4A that the first upper end $X_1$ and the second upper end $X_2$ are positioned at the same height in the direction of gravity, but the first upper end $X_1$ may be positioned to be higher than the second upper end $X_2$ in the direction of gravity.

As will be described in detail later, the upper end edge $X_1$-$X_2$ of the first bulging portion 54 is set at an appropriate position with respect to the first flat tube 40a (not illustrated, see FIG. 3) inserted into the first notch 51a above the first bulging portion 54. As a result, condensed water adhering to the periphery of the first flat tube 40a flows through a windward end (a right end in the drawing) of the first notch 51a (first flat tube 40a) along a direction hi toward an edge of the first notch 51a, and reaches the upper end edge $X_1$-$X_2$ of the first bulging portion 54.

After reaching the upper end edge $X_1$-$X_2$, the condensed water is substantially equally split into two flows, that is, a flow in a direction $W_1$ in which the condensed water is transferred along an intermediate portion-side edge $X_1$-$Z_1$ connecting the first upper end $X_1$ and the first lower end $Z_1$ to each other, and a flow in a direction $W_2$ in which the condensed water is transferred along a connecting portion-side edge $X_2$-$Z_2$ connecting the second upper end $X_2$ and the second lower end $Z_2$ to each other. Then, all of the condensed water transferred along the direction $W_1$ and the direction $W_2$ is discharged downward of the heat exchanger 23 in the direction of gravity along the connecting portion 53, rather than dropping onto the second flat tube 40b (not illustrated, see FIG. 3) inserted into the second notch 51b below the first bulging portion 54.

Figure 4B:
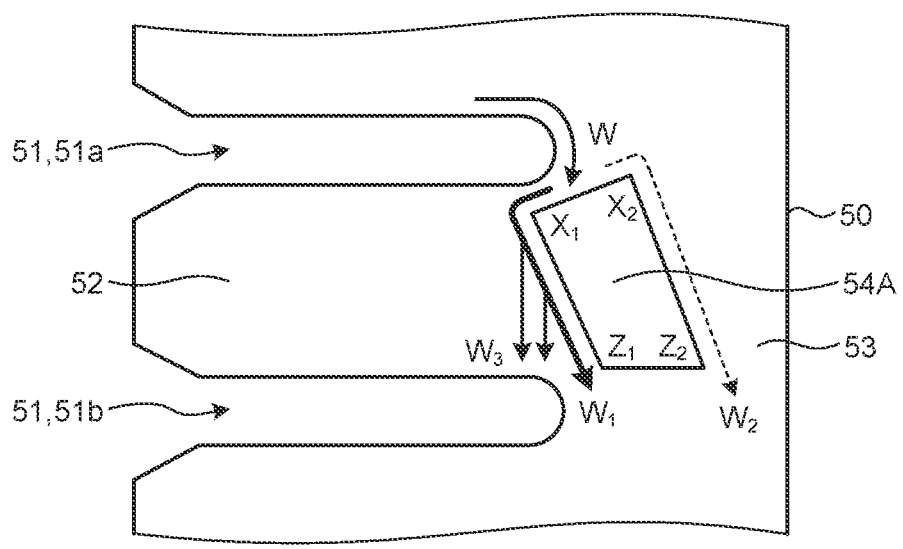
FIG. 4B is a view illustrating a first bulging portion in a comparative example.

On the other hand, FIG. 4B illustrates a first bulging portion 54A as a comparative example. In the first bulging portion 54A, a first upper end $X_1$ is formed to be lower than a second upper end $X_2$ in the direction of gravity. In the comparative example of FIG. 4B, since the first upper end $X_1$ is positioned to be lower than the second upper end $X_2$, after the condensed water is transferred to an upper end edge $X_1$-$X_2$ of the first bulging portion 54A, a large amount of the condensed water is transferred to an intermediate portion-side edge $X_1$-$Z_1$, and flows intensively along a direction $W_1$, and a small amount of the condensed water is transferred to a connecting portion-side edge $X_2$-$Z_2$, and flows along a direction $W_2$. Then, due to the influence of gravity, some of the large amount of the condensed water flowing along the direction $W_1$, passes through the intermediate portion 52 along a direction $W_3$, and drops onto the second flat tube 40b (not illustrated, see FIG. 3) inserted into the second notch 51b below the first bulging portion 54A. In contrast, the first bulging portion 54 according to the present embodiment, makes it possible to smoothly discharge the condensed water downward along the connecting portion 53, while preventing the condensed water from flowing intensively on the intermediate portion 52 side.

Figure 5:
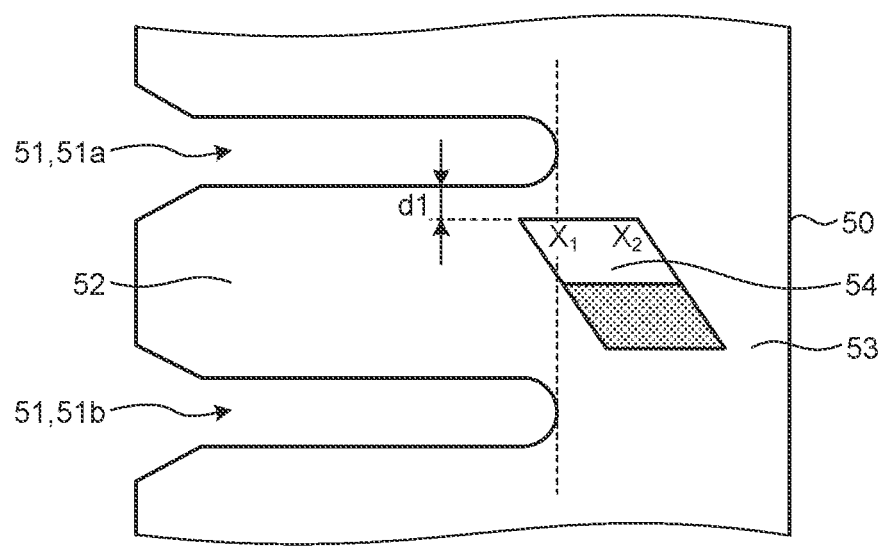
FIG. 5 is a side view illustrating a positional relationship of the first bulging portion.
Figure 6:
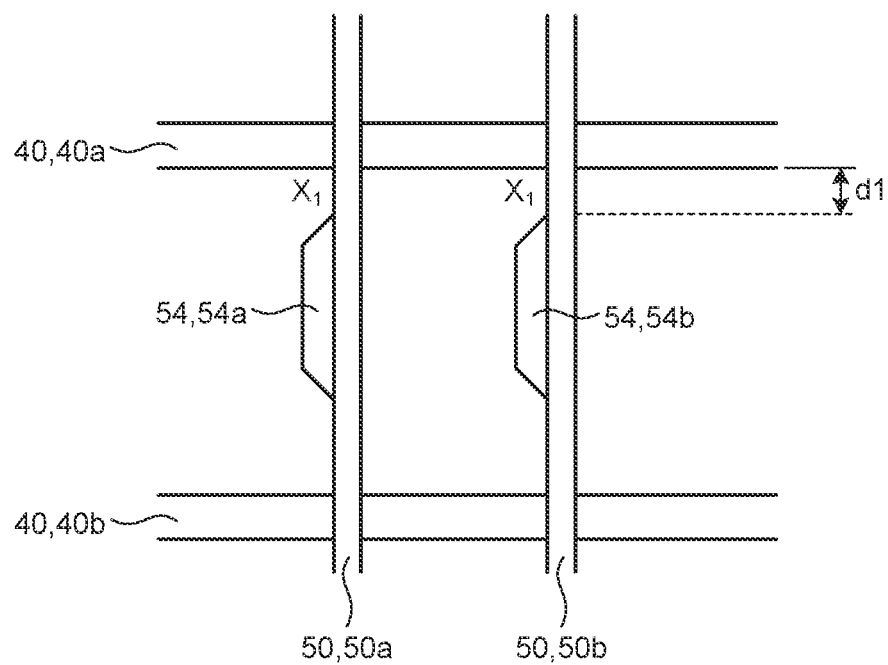
FIG. 6 is a front view illustrating the positional relationship of the first bulging portion.
Figure 7:
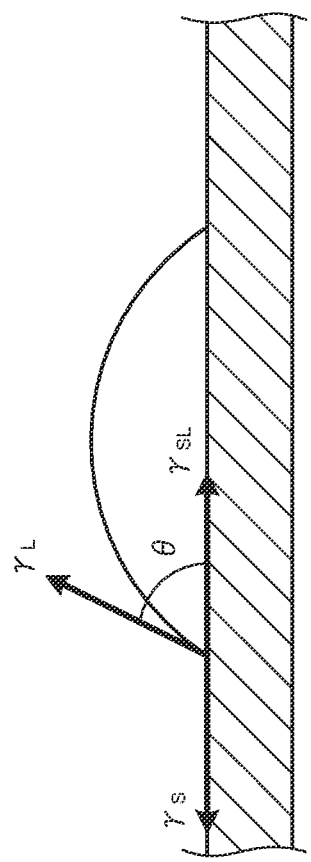
FIG. 7 is a view illustrating a contact angle between a liquid and a solid.

Here, as illustrated in FIGS. 5 and 6, in order to smoothly discharge the condensed water retained around the first flat tube 40a, the first bulging portion 54 according to the present embodiment, is preferably formed such that a distance d1 between the first upper end $X_1$ of the first bulging portion 54 and a lower side of the first notch 51a in the vertical direction is in a range of 4 mm or less. The reason, why the distance d1 is set to the range of 4 mm or less, is based on a verification result to be described below. Note that FIG. 5 is a side view of the heat exchanger 23, and FIG. 6 is a front view of the heat exchanger 23. The condensed water adheres onto one or both of the flat tubes 40 and the fins 50 as droplets, and a relationship between a contact angle with respect to each of the flat tubes 40 and the fins 50 and a surface tension, is represented by the following Young's equation, which is a relationship illustrated in FIG. 7.

$$\gamma_S = \gamma_L \cdot \cos\theta + \gamma_{SL} \qquad \text{Young's Equation,}$$

where θ is a contact angle $\gamma_S$ is a surface tension of solid $\gamma_L$ is a surface tension of liquid $\gamma_{SL}$ is an interfacial tension between solid and liquid FIGS. 13A and 13B are diagrams for comparing sizes d2 of condensed water (droplets) retained around the first flat tube 40a at different contact angles θ. FIG. 13A illustrates an average value of measurement results of droplet sizes d2 at each fin pitch (1.0 mm, 1.5 nm, or 2.0 mm) when the contact angle θ is 10°. FIG. 13B illustrates an average value of measurement results of droplet sizes d2 at each fin pitch (1.0 mm, 1.5 mm, or 2.0 mm) when the contact angle θ is 60°.

Figure 8A:
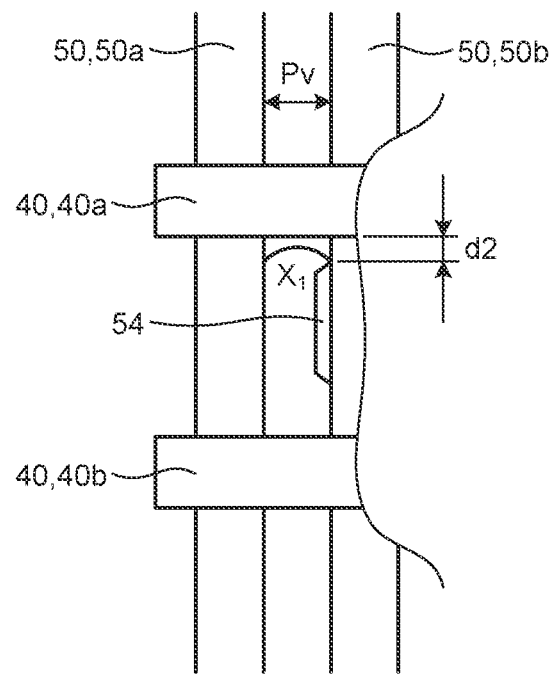
FIG. 8A is a front view illustrating a distance between an upper end edge of the first bulging portion and a lower side of a first notch.

As test conditions for the condensed water retained between the first fin 50a and the second fin 50b adjacent to each other as illustrated in FIG. 8A, fin pitches Pv between the fins 50 were set to three kinds, i.e. 1.0 mm, 1.5 mm, and 2.0 mm, and droplet sizes d2 of the condensed water were measured (1) in a case where the contact angle θ was 10 degrees as a state in which the surfaces of the fins 50 sufficiently functioned for hydrophilic processing and (2) in a case where the contact angle θ was 60 degrees as a state in which the surfaces of the fins 50 did not function for hydrophilic processing due to deterioration or contamination. Note that the contact angle θ was adjusted by mixing a surfactant with water forming a droplet. That is, the contact angle θ of the droplet was reduced by increasing an amount of the surfactant. In this test, the fins 50 formed of an acrylic material were used. The fins 50 formed of an acrylic material differs from actual fins formed of an aluminum material in how easily the water spreads on the surfaces of the fins. Therefore, by adjusting the amount of the surfactant such that the contact angle θ with respect to the acrylic fin is equal to that with respect to the aluminum fin, the verification can be performed without being influenced even though the material is different from that of the actual fin.

As illustrated in FIG. 13A, as a result of measuring droplet sizes d2 under the condition that the fin pitch Pv was 1.0 mm while the contact angle θ was 10°, an average value of the sizes d2 was 3.0 mm. In addition, as illustrated in FIG. 13A, as a result of measuring droplet sizes d2 under the condition that the fin pitch Pa was 1.5 mm while the contact angle θ was 10°, an average value of the sizes d2 was 3.3 mm. In addition, as illustrated in FIG. 13A, as a result of measuring droplet sizes d2 under the condition that the fin pitch Pv was 2.0 mm while the contact angle θ was 10°, an average value of the sizes d2 was 3.1 mm.

In addition, as illustrated in FIG. 13B, as a result of measuring droplet sizes d2 under the condition that the fin pitch Pv was 1.0 mm while the contact angle θ was 60°, an average value of the sizes d2 was 11.0 mm. In addition, as illustrated in FIG. 13B, as a result of measuring droplet sizes d2 under the condition that the fin pitch Pv was 1.5 mm while the contact angle θ was 60°, an average value of the sizes d2 was 11.2 mm. In addition, as illustrated in FIG. 13B, as a result of measuring droplet sizes d2 under the condition that the fin pitch Pv was 2.0 mm while the contact angle θ was 60°, an average value of the sizes d2 was 11.3 mm.

Based on the foregoing measurement results, the smaller the contact angle θ, the smaller the droplet size d2, and accordingly, the smaller the distance d1 between the first upper end $X_1$ of the first bulging portion 54 and the lower side of the first notch 51a, needs to be set. Although the surface of the fin 50 is generally subjected to a hydrophilic treatment, the contact angle θ of the droplet retained on the surface of the fin subjected to the hydrophilic treatment, is set to 20° or to 20° or less. Since the effect of the hydrophilic treatment on the fin 50 is weakened due to contamination or deterioration, the distance d1 between the first upper end $X_1$ of the first bulging portion 54 and the lower side of the first notch 51a, may be set to correspond to a droplet size d2 at a contact angle θ of 20° in a non-used product state.

Therefore, an approximate expression of the droplet size d2 according to the contact angle θ, was produced from the foregoing measurement results, and the droplet size d2 at the contact angle θ of 20° was obtained. As a result, it has been found that in a case where the distance d1 is 4 mm or less, even when the contact angle θ is 20°, the first upper end $X_1$ of the first bulging portion 54 is in contact with a lower end of a droplet adhering to a lower surface of the first flat tube 40a (the lower side of the first notch 51a).

Figure 8B:
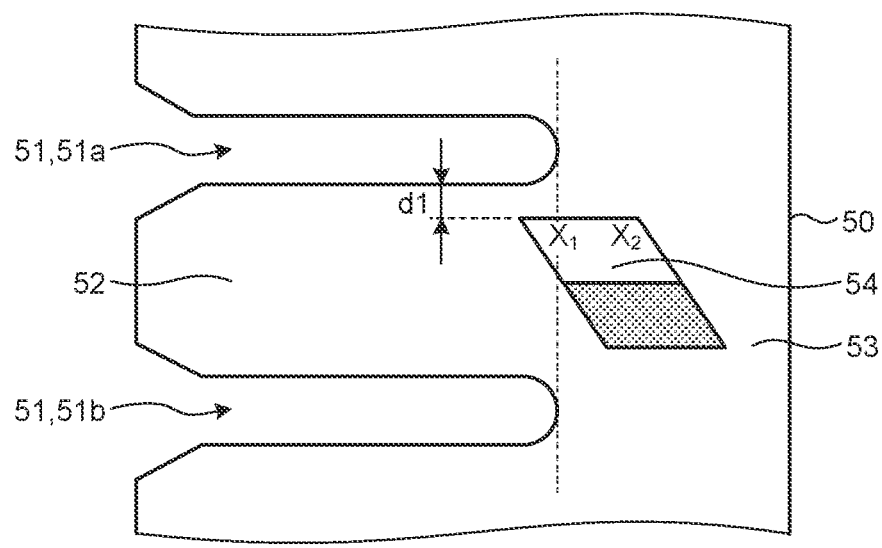
FIG. 8B is a side view illustrating the distance between the upper end edge of the first bulging portion and the lower side of the first notch.

Therefore, by setting the distance d1 between the first upper end $X_1$, of the first bulging portion 54 and the lower side of the first notch 51a as illustrated in FIG. 8B to 4 mm or less, even when the contact angle θ is 20° at which the droplet size d1 of the condensed water is small (in a state where the surface of the fin 50 sufficiently functions for hydrophilic processing), the distance d1 can be smaller than a minimum droplet size d2, and the droplet can reach the first upper end $X_1$ of the first bulging portion 54.

In this way, when the water droplets of the condensed water reach the first upper end $X_1$ of the first bulging portion 54, the water droplets wet spread on the upper end edge $X_1$-$X_2$ due to the influence of surface tension, and pass through the first upper end $X_1$ and the second upper end $X_2$ again to the intermediate portion-side edge $X_1$-$Z_1$ and the connecting portion-side edge $X_2$-$Z_2$. The water droplets are influenced by gravity in addition to the influence of surface tension on the intermediate portion-side edge $X_1$-$Z_1$ and the connecting portion-side edge $X_2$-$Z_2$. Thus, the first bulging portion 54 makes it easy to discharge the water droplets.

Figure 9:
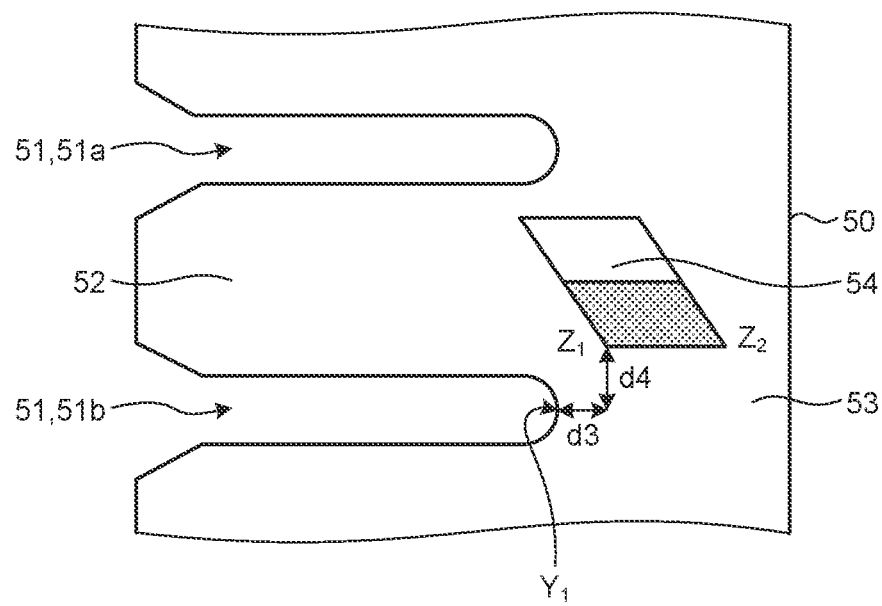
FIG. 9 is a view illustrating a distance between a lower end edge of the first bulging portion and an intermediate portion-side end of a second notch.

Further, as illustrated in FIG. 9, the first bulging portion 54 is preferably formed such that a horizontal-direction distance (a distance in a direction orthogonal to the vertical direction) d3 between the first lower end $Z_1$ positioned on the intermediate portion 52 side of the first bulging portion 54 and a connecting portion-side end $Y_1$ of the second notch 51b, is ⅙ or more of a gravity-direction distance (a distance in the vertical direction) d4 between the first lower end $Z_1$ and the connecting portion-side end $Y_1$ of the second notch 51b positioned on the connecting portion 53 side. This reflects the gravity applied to water droplets when acting with a force of about 5 times a drag force acting on the water droplets by a wind force in a ventilation direction (a force received from wind in the ventilation direction), taking into account a size d1 of the water droplets produced between the first fin 50a and the second fin 50b and a maximum value (5 m/s) of a local wind speed. The local wind speed is predetermined by fluid analysis. Here, the connecting portion-side end $Y_1$, of the second notch 51b in the present embodiment, is formed to bulge toward the connecting portion 53 in an arc shape. Thus, the connecting portion-side end $Y_1$ is positioned at the center between an upper side and a lower side of the second notch 51.

Specifically, the gravity force F and the drag force D applied to the water droplets, are expressed by the following equations.

$$D = Cd * A * \rho_{air} v^2 / 2g$$

Cd . . . drag coefficient
A . . . projected area of water droplet ($A = \pi r^2 / 2$) [m²]
r . . . radius of water droplet [m]
ρair . . . density of air [kg/m³]
v . . . wind speed [m/s]
g . . . gravitational acceleration $$F = M * g$$

M . . . weight of water droplet ($M = 4\pi r^3 / 3$) [g]

Note that, in order for the water droplets retained in a state where a surface tension, a gravity force, a static friction force, and the like are balanced at the first lower end $Z_1$ to be discharged from the first lower end $Z_1$, the water droplets need to greatly grow so that the gravity force exceeds a force acting above the direction of gravity such as the surface tension. Therefore, a relative positional relationship between the first lower end $Z_1$ and the connecting portion-side end $Y_1$, may be set based on a relationship between the gravity force and the drag force in a state where the radius of the water droplet has become large to some extent (e.g. 0.6 mm). When the gravity force F is compared with the drag force D, the gravity force F is six times larger than the drag force D. The horizontal-direction distance d3 is preferably less than ⅙ times the gravity-direction distance d4.

Figure 10:
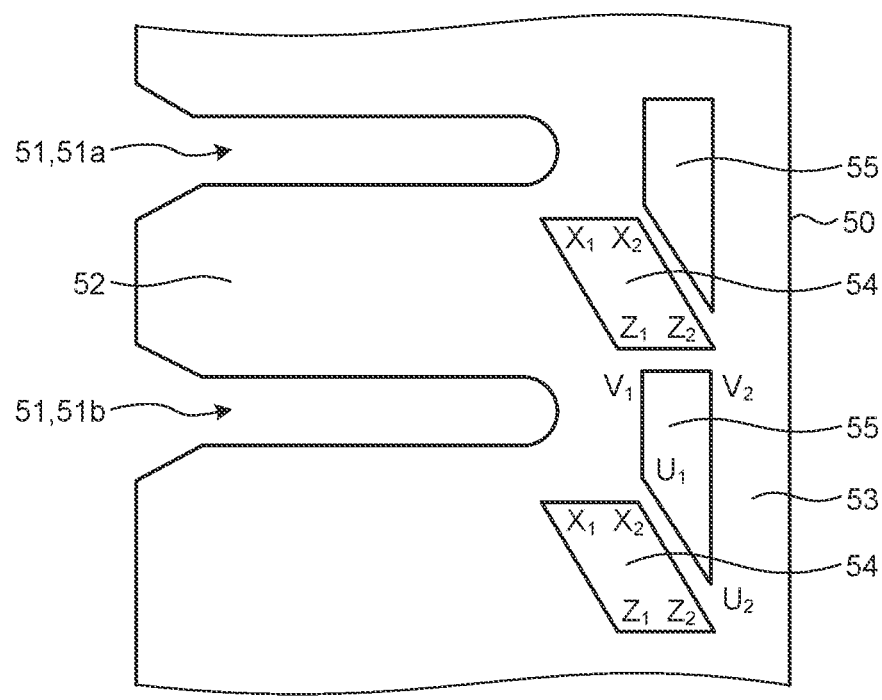
FIG. 10 is a view illustrating an aspect in which a second bulging portion is further provided.

As illustrated in FIG. 10, a second bulging portion 55 may be further provided below the lower end edge $Z_1$-$Z_2$ of the first bulging portion 54. An upper end edge of the second bulging portion 55 is disposed close to and below the lower end edge $Z_1$-$Z_2$ of the first bulging portion 54. In addition, a lower end edge $U_1$-$U_2$ of the second bulging portion 55 does not intersect with the upper end edge $X_1$-$X_2$ of the first bulging portion 54. The second bulging portion 55 is provided such that water droplets falling down from the first bulging portion 54 is guided from the first bulging portion 54 to another first bulging portion 54 downwardly via the second bulging portion 55, without being scattered by the influence of wind. Further, the second bulging portion 55 may be formed such that the upper end edge $V_1$-$V_2$ of the second bulging portion 55 is positioned within a range of 4 mm or less from the lower end edge $Z_1$-$Z_2$ of the first bulging portion 54 in the vertical direction. The reason is the same as that why the distance d1 between the first upper end $X_1$ of the first bulging portion 54 and the lower side of the first notch 51a is set to 4 mm or less as described above.

Since the first bulging portion 54 is disposed to straddle the boundary between the intermediate portion 52 and the connecting portion 53 of the fin 50 (see FIG. 5), the mechanical strength of the fin 50 can be increased to suppress bending of the fin 50 in an assembly process or the like. In addition, since the second bulging portion 55 is disposed in the connecting portion 53 to straddle the position of the notch 51 in the vertical direction, the mechanical strength of the connecting portion 53 near the notch 51 can also be increased to suppress bending of the fin 50 in an assembly process or the like.

Figure 11:
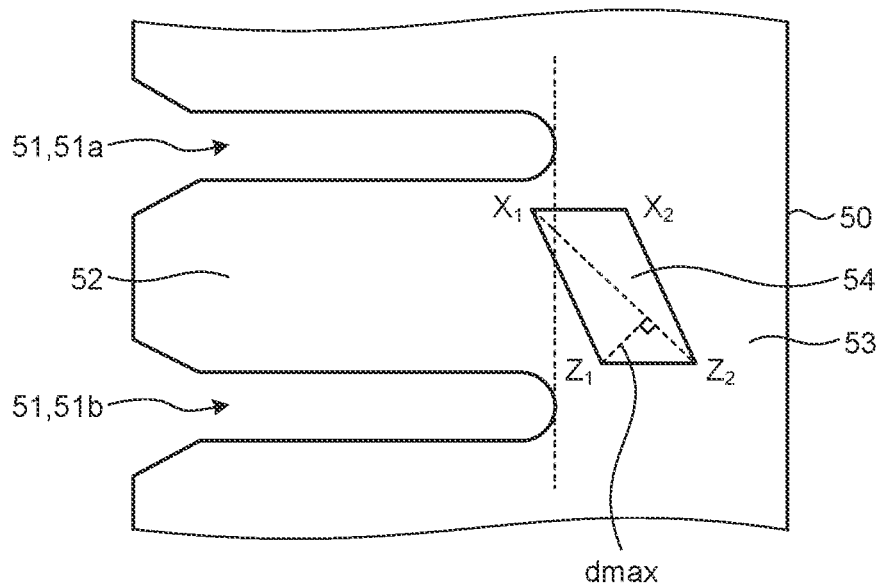
FIG. 11 is a side view illustrating a positional relationship of the first bulging portion.

In addition, as illustrated in FIG. 11, in the first bulging portion 54, together with the second lower end $Z_2$ positioned on the connecting portion 53 side of the lower end edge $Z_1$-$Z_2$, the first lower end $Z_1$ is positioned in the connecting portion 53. In addition, in the first bulging portion 54, a point dmax (the first lower end $Z_1$ in FIG. 11), at which a perpendicular distance d of a connection line passing along the edges of the first bulging portion 54 from the first upper end $X_1$ from a straight line connecting the first upper end $X_1$ and the second lower end $Z_2$ to each other is maximum, is positioned in the connecting portion 53. As a result, the first bulging portion 54 makes it possible to perform the discharge more smoothly perform the discharge.

Figure 12:
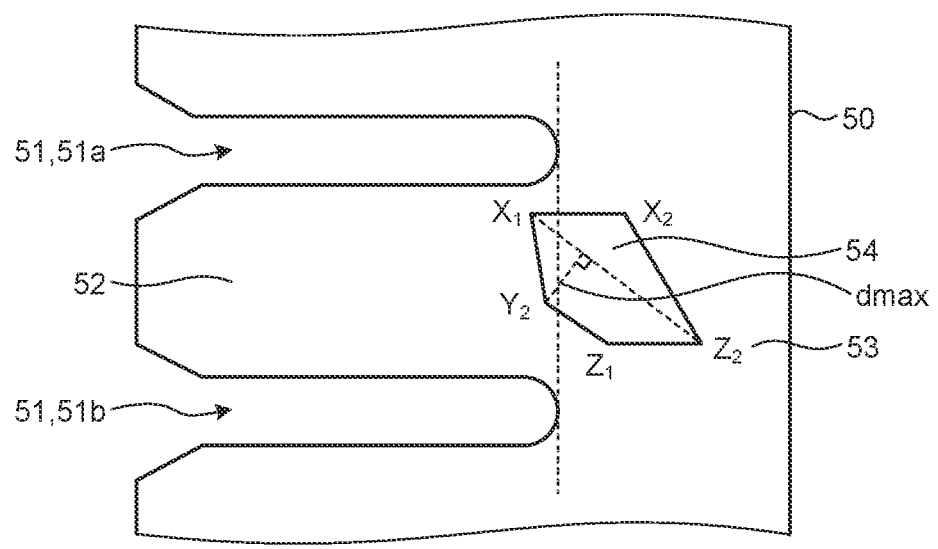
FIG. 12 is a side view illustrating a positional relationship of a first bulging portion in a comparative example.

FIG. 12 illustrates a first bulging portion 54 in a comparative example. As illustrated in FIG. 12, in the first bulging portion 54 of the comparative example, a point $Y_2$, at which a perpendicular distance d to a connection line passing along edges of the first bulging portion 54 from the first upper end $X_1$ from a straight line connecting a first upper end $X_1$ and a second lower end $Z_2$ to each other is maximum, is positioned in the intermediate portion 52. In the comparative example, condensed water flowing along an intermediate portion-side edge $X_1$-$Z_1$ from the first upper end $X_1$ stagnates at the point $Y_2$ due to surface tension, and then flows toward an intermediate portion-side lower end $Z_1$. At this time, there is concern that the condensed water retained at the point $Y_2$ may drop onto the second flat tube 40b (not illustrated) inserted into the second notch 51b due to the influence of gravity or wind.

Effects of Embodiment

The condensed water retained around the flat tube 40 can be reduced, thereby shortening a time period during which the condensed water is discharged. Specifically, since the first bulging portion 54 is provided below the flat tube 40, the condensed water flowing from the upper surface to the lower surface of the flat tube 40 and the condensed water generated on the lower surface of the flat tube 40, can be influenced by surface tension and gravity, thereby smoothly discharging the condensed water. In addition, since the connecting portion 53 of the fin 50 is positioned on the windward side, the condensed water discharged from the first bulging portion 54, can be prevented from flowing toward the region of the flat tube 40, thereby smoothly discharging the condensed water. In addition, since the second bulging portion 55 is provided below the first bulging portion 54, the condensed water can be smoothly discharged without being influenced by wind.

REFERENCE SIGNS LIST

1 AIR CONDITIONER
2 OUTDOOR UNIT
3 INDOOR UNIT
4 LIQUID PIPE
5 GAS PIPE
10 REFRIGERANT CIRCUIT
10a OUTDOOR UNIT REFRIGERANT CIRCUIT
10b INDOOR UNIT REFRIGERANT CIRCUIT
12 HEADER
21 COMPRESSOR
22 FOUR-WAY VALVE
23 OUTDOOR HEAT EXCHANGER
24 EXPANSION VALVE
25 LIQUID-SIDE SHUTOFF VALVE
26 GAS-SIDE SHUTOFF VALVE
27 OUTDOOR FAN
31 INDOOR HEAT EXCHANGER
32 INDOOR FAN
33 LIQUID PIPE CONNECTION PORTION
34 GAS PIPE CONNECTION PORTION
40 FLAT TUBE
50 FIN
51 NOTCH
52 INTERMEDIATE PORTION
53 CONNECTING PORTION
54 FIRST BULGING PORTION
55 SECOND BULGING PORTION
61 DISCHARGE PIPE
62 REFRIGERANT PIPE
63 OUTDOOR UNIT LIQUID PIPE
64 OUTDOOR UNIT GAS PIPE
66 SUCTION PIPE
67 INDOOR UNIT LIQUID PIPE
68 INDOOR UNIT GAS PIPE
71 DISCHARGE PRESSURE SENSOR
72 SUCTION PRESSURE SENSOR
73 DISCHARGE TEMPERATURE SENSOR
74 SUCTION TEMPERATURE SENSOR
75 HEAT EXCHANGE TEMPERATURE SENSOR
76 OUTSIDE AIR TEMPERATURE SENSOR
77 LIQUID-SIDE TEMPERATURE SENSOR
78 GAS-SIDE TEMPERATURE SENSOR
79 ROOM TEMPERATURE SENSOR
200 OUTDOOR UNIT CONTROL MEANS
210 CPU
220 STORAGE UNIT
230 COMMUNICATION UNIT
240 SENSOR INPUT UNIT
300 INDOOR UNIT CONTROL MEANS
310 CPU
320 STORAGE UNIT
330 COMMUNICATION UNIT
340 SENSOR INPUT UNIT

The invention claimed is:

1. A heat exchanger comprising:
a plurality of flat tubes;
a fin in which a plurality of notches are arranged side by side in a vertical direction for the plurality of flat tubes to be inserted thereinto, respectively, the fin having a plurality of intermediate portions, each formed between two of the notches positioned adjacent to each other in the vertical direction, and a connecting portion connecting the intermediate portions to each other;
a first bulging portion having an upper end edge and a lower end edge provided between a first notch and a second notch included in the plurality of notches, the first notch being an upper notch and the second notch being a lower notch between the two notches positioned adjacent to each other in the vertical direction with the intermediate portion interposed therebetween, and the upper end edge being positioned in the intermediate portion and the lower end edge being positioned in the connecting portion; and a second bulging portion provided below the lower end edge of the first bulging portion, wherein the upper end edge has a first upper end positioned on an intermediate portion side, and a second upper end positioned on a connecting portion side, the first upper end being positioned to be higher than the second upper end, or the first upper end being positioned at the same height as the second upper end, the second bulging portion has an upper end edge formed along the lower end edge of the first bulging portion and a lower end edge formed below the second notch, the upper end edge of the second bulging portion has a first upper end positioned on the intermediate portion side and a second upper end positioned on the connecting portion side, and the lower end edge of the second bulging portion has a first lower end positioned on the intermediate portion side and a second lower end positioned on the connecting portion side, and a left end edge connecting the first upper end and the first lower end of the second bulging portion, and a right end edge connecting the second upper end and the second lower end of the second bulging portion extend in the vertical direction.

2. The heat exchanger according to claim 1, wherein, at the first bulging portion, the lower end edge is formed such that a distance in a direction orthogonal to the vertical direction between a first lower end thereof positioned on the intermediate portion side, and a connecting portion-side end of the second notch positioned on the connecting portion side, is less than 1/6 times a distance in the vertical direction between the first lower end and the connecting portion-side end.

3. The heat exchanger according to claim 2, wherein, at the first bulging portion, a point, at which a perpendicular distance of a connection line passing through a second lower end of the lower end edge positioned on the connecting portion side, the first lower end, and the first upper end along edges of the first bulging portion from a straight line connecting the first upper end and the second lower end to each other is maximum, is positioned in the connecting portion.

4. The heat exchanger according to claim 1, wherein the first bulging portion is formed such that the first upper end is positioned within a range of 4 mm or less from a lower side of the first notch.

5. The heat exchanger according to claim 1,
wherein the second bulging portion is formed such that the upper end thereof is positioned within a range of 4 mm or less from the lower end edge of the first bulging portion.

6. An air conditioner comprising the heat exchanger according to claim 1.

7. The heat exchanger according to claim 1, wherein a plurality of the first bulging portions are spaced along the vertical direction of the fin, and the lower end edge of the second bulging portion is formed along a connection line connecting the second upper end of the first bulging portion adjacent below the second bulging portion and the second lower end of the lower end edge positioned on the connecting portion side of the first bulging portion.

* * * * *